(12) United States Patent
Melman et al.

(10) Patent No.: US 9,203,735 B2
(45) Date of Patent: Dec. 1, 2015

(54) PACKET FORWARDING APPARATUS AND METHOD

(71) Applicants:Marvell Israel (M.I.S.L) Ltd., Yokneam (IL); MARVELL INTERNATIONAL LTD., Hamilton (BM)

(72) Inventors: David Melman, Hakerem (IL); Nir Arad, Nesher (IL); Nafea Bishara, San Jose, CA (US)

(73) Assignees: Marvell International Ltd., Hamilton (BM); Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 14/188,484

(22) Filed: Feb. 24, 2014

(65) Prior Publication Data

US 2014/0169382 A1    Jun. 19, 2014

Related U.S. Application Data

(63) Continuation of application No. 13/340,393, filed on Dec. 29, 2011, now Pat. No. 8,660,120, which is a continuation of application No. 12/881,123, filed on Sep. 13, 2010, now Pat. No. 8,089,963, which is a (Continued)

(51) Int. Cl.
*H04L 12/28* (2006.01)
*H04L 12/715* (2013.01)

(Continued)

(52) U.S. Cl.
CPC ............... *H04L 45/04* (2013.01); *H04L 12/46* (2013.01); *H04L 12/4625* (2013.01);

(Continued)

(58) Field of Classification Search
CPC ...... H04L 45/05; H04L 12/4625; H04L 45/00; H04L 45/60; H04L 49/109; H04L 49/351; H04L 12/46; H04L 45/08
See application file for complete search history.

(56) References Cited

U.S. PATENT DOCUMENTS 5,029,164 A    7/1991  Goldstein et al.
6,185,188 B1   2/2001  Hasegawa (Continued)

FOREIGN PATENT DOCUMENTS

EP    1885139 A1    2/2008

OTHER PUBLICATIONS

International Search Report and Written Opinion for International Application No. PCT/US2010/055115, dated Jan. 27, 2011.

(Continued)

*Primary Examiner* — Robert Wilson

(57) ABSTRACT

A network device includes a plurality of physical ports configured to be coupled to one or more networks, and a processor device configured to process packets. The processor device includes a processor configured to implement a logical port assignment mechanism to assign source logical port information to a data packet received via a source physical port of the plurality of physical ports. The source logical port information is assigned based on one or more characteristics of the data packet, and the source logical port information corresponds to a logical entity that is different from any physical port. The processor device also includes a forwarding engine processor configured to determine one or more egress logical ports for forwarding the data packet, map the egress logical port(s) to respective egress physical port(s) of the plurality of physical ports, and forward the data packet to the egress physical port(s) based on the mapping.

23 Claims, 6 Drawing Sheets

Related U.S. Application Data continuation of application No. 12/030,822, filed on Feb. 13, 2008, now Pat. No. 7,796,594.

(60) Provisional application No. 60/916,065, filed on May 4, 2007, provisional application No. 60/889,809, filed on Feb. 14, 2007.

(51) Int. Cl.
*H04L 12/46* (2006.01)
*H04L 12/701* (2013.01)
*H04L 12/773* (2013.01)
*H04L 12/933* (2013.01)
*H04L 12/931* (2013.01)
*H04L 12/751* (2013.01)

(52) U.S. Cl.
CPC ............. *H04L 45/00* (2013.01); *H04L 45/08* (2013.01); *H04L 45/60* (2013.01); *H04L 49/109* (2013.01); *H04L 49/351* (2013.01)

(56) References Cited

U.S. PATENT DOCUMENTS

| | | | |
|---|---|---|---|
| 6,757,249 B1 | 6/2004 | Kejriwal et al. | |
| 6,859,835 B1 | 2/2005 | Hipp | |
| 6,985,956 B2 | 1/2006 | Luke et al. | |
| 7,006,494 B1 * | 2/2006 | Tighe et al. | 370/389 |
| 7,467,191 B1 | 12/2008 | Wang et al. | |
| 7,574,202 B1 | 8/2009 | Tsao et al. | |
| 7,796,594 B2 * | 9/2010 | Melman et al. | 370/389 |
| 7,889,728 B2 * | 2/2011 | Arad et al. | 370/389 |
| 8,089,963 B2 * | 1/2012 | Melman et al. | 370/389 |
| 8,234,361 B2 | 7/2012 | Krywaniuk | |
| 8,320,255 B2 | 11/2012 | Vasseur et al. | |
| 8,660,120 B2 * | 2/2014 | Melman et al. | 370/389 |
| 2002/0093952 A1 * | 7/2002 | Gonda | 370/369 |
| 2003/0137978 A1 | 7/2003 | Kanetake | |
| 2003/0212830 A1 | 11/2003 | Greenblat et al. | |
| 2004/0015599 A1 | 1/2004 | Trinh et al. | |
| 2004/0044744 A1 | 3/2004 | Grosner et al. | |
| 2004/0252722 A1 | 12/2004 | Wybenga et al. | |
| 2005/0232303 A1 | 10/2005 | Deforche et al. | |
| 2006/0002386 A1 | 1/2006 | Yik et al. | |
| 2006/0230185 A1 | 10/2006 | Errickson et al. | |
| 2007/0266173 A1 | 11/2007 | Wong et al. | |
| 2008/0159277 A1 | 7/2008 | Vobbilisetty et al. | |
| 2008/0205403 A1 | 8/2008 | Akyol et al. | |
| 2008/0225853 A1 * | 9/2008 | Melman et al. | 370/392 |
| 2008/0232253 A1 | 9/2008 | Wilt et al. | |
| 2008/0285555 A1 | 11/2008 | Ogasahara | |
| 2009/0083445 A1 | 3/2009 | Ganga | |
| 2009/0157846 A1 | 6/2009 | Shimozono et al. | |
| 2009/0296579 A1 | 12/2009 | Dharwadkar et al. | |
| 2010/0281437 A1 | 11/2010 | Stone-Perez et al. | |
| 2011/0007744 A1 * | 1/2011 | Melman et al. | 370/392 |
| 2012/0106553 A1 * | 5/2012 | Melman et al. | 370/392 |
| 2012/0291117 A1 | 11/2012 | Krywaniuk | |
| 2014/0169382 A1 * | 6/2014 | Melman et al. | 370/401 |

OTHER PUBLICATIONS

International Preliminary Report on Patentability for International Application No. PCT/US2010/055115, dated May 8, 2012.

* cited by examiner

PACKET FORWARDING APPARATUS AND METHOD

CROSS-REFERENCE TO RELATED APPLICATIONS

This is a continuation of U.S. patent application Ser. No. 13/340,393 (now U.S. Pat. No. 8,660,120), entitled "Packet Forwarding Apparatus and Method" and filed on Dec. 29, 2011, which is a continuation of U.S. patent application Ser. No. 12/881,123 (now U.S. Pat. No. 8,089,963), entitled "Packet Forwarding Apparatus and Method" and filed on Sep. 13, 2010, which is a continuation of U.S. patent application Ser. No. 12/030,822 (now U.S. Pat. No. 7,796,594), entitled "Logical Bridging System and Method" and filed on Feb. 13, 2008, which claims the benefit of U.S. Provisional Patent Application No. 60/916,065, entitled "Local Bridge Implementation" and filed on May 4, 2007, and U.S. Provisional Patent Application No. 60/889,809, entitled "Prestera DX Support for CAPWAP and WLAN Switching" and filed on Feb. 14, 2007. The disclosures of all of the applications listed above are hereby incorporated by reference herein.

BACKGROUND

1. Field of the Disclosure

Aspects of the present disclosure relate generally to data communications, and more particularly to a system and method of extending a standard bridge to execute logical bridging functionality.

2. Background

Various types of virtual networking technologies are generally known. One popular communications standard for use in connection with virtual network implementations is the Institute of Electrical and Electronics Engineers (IEEE) 802.1Q standard for Ethernet applications. In accordance with certain features of this standard, a service provider may preserve a customer's virtual local area network (VLAN) protocols, groupings, privileges, and other VLAN parameters across the service provider's network backbone. In that regard, one or more ports dedicated to a customer may map customer communications across the provider's VLAN, relieving the customer from having to assign service provider VLAN identifications to network traffic. Accordingly, multiple customer VLAN data communications may be supported by a single service provider's network; this networking strategy is generally referred to as 802.1Q tunneling or 802.1QinQ.

It is noted that data packets transmitted using QinQ (or other types of networking protocols) are generally forwarded in accordance with a VLAN identification (VID) and a destination media access controller (MAC) address for each packet, facilitated by lookup tables, forwarding databases, or other data structures maintained at a network bridge, i.e., a network switch operative to transmit data and control packets across different network domains. Ordinary bridge architectures simply switch a packet from a physical ingress port to a physical egress port that is associated with the same VLAN as the ingress port. These architectures are generally limited with respect to the number of service instances, i.e., discrete VLANs, that they are able to handle. In many cases, for instance, a bridge may only be able to recognize 4,096 different virtual networks—this limitation is generally constrained by the size of the fields in packet headers (dictated by the networking protocol utilized by the network) and the characteristics of the data structure that correlates VLAN instances with VIDs and MAC addresses.

Additionally, in wireless local area network (WLAN) implementations, when a WLAN access point device receives packets from wireless stations, each data packet is generally associated with an index called a Received Signal Strength Indicator (RSSI). In use, RSSI values may be employed by intelligent applications for, among other things, discovering the location of WLAN stations or optimizing the locations of access points. While RSSI data may be useful in various ways, conventional bridging hardware does not extract RSSI information from data packets originating from wireless networks.

Although extending conventional bridge architecture and functionality to accommodate an arbitrary number of different VLANs for a multiplicity of customers and to collect RSSI information for wireless data traffic may have utility in various applications, such bridging operations are generally not contemplated in conventional inter-network communications strategies.

SUMMARY OF THE DISCLOSURE

In one embodiment, a network device includes a plurality of physical ports configured to be coupled to one or more networks, and a processor device configured to process packets. The processor device includes a processor configured to implement a logical port assignment mechanism to assign source logical port information to a data packet received via a source physical port of the plurality of physical ports. The source logical port information is assigned based on one or more characteristics of the data packet, and the source logical port information corresponds to a logical entity that is different from any physical port. The processor device also includes a forwarding engine processor configured to (i) determine one or more egress logical ports for forwarding the data packet, (ii) map the one or more egress logical ports to respective one or more egress physical ports of the plurality of physical ports, and (iii) forward the data packet to the one or more egress physical ports based on the mapping.

In another embodiment, a method implemented in a network device includes assigning, in the network device and based on one or more characteristics of a data packet received via a source physical port of a plurality of physical ports of the network device, source logical port information to the data packet. The source logical port information corresponds to a logical entity that is different from any physical port. The method also includes determining, in the network device, one or more egress logical ports for forwarding the data packet, mapping, in the network device, the one or more egress logical ports to respective one or more egress physical ports of the plurality of physical ports, and forwarding the data packet to the one or more egress physical ports based on the mapping.

In another embodiment, a network device includes a receiver block configured to couple to at least one source physical port, a transmitter block configured to couple to at least one egress physical port, and a processor device configured to process packets. The processor device includes a processor configured to implement a logical port assignment mechanism to assign source logical port information to a data packet received via one of the at least one source physical port. The source logical port information is assigned based on one or more characteristics of the data packet, and the source logical port information corresponds to a logical entity that is different from any source physical port. The processor device also includes a forwarding engine processor configured to determine at least one of (i) one or more egress physical ports, or (ii) one or more egress logical ports, for forwarding the data packet.

In another embodiment, a method implemented in a network device includes assigning, in the network device and based on one or more characteristics of a data packet received via a source physical port of the network device, source logical port information to the data packet. The source logical port information corresponds to a logical entity that is different from any source physical port. The method also includes determining, in the network device, at least one of (i) one or more egress physical ports of the network device, or (ii) one or more egress logical ports, for forwarding the data packet.

DETAILED DESCRIPTION

Introduction

Figure 1:
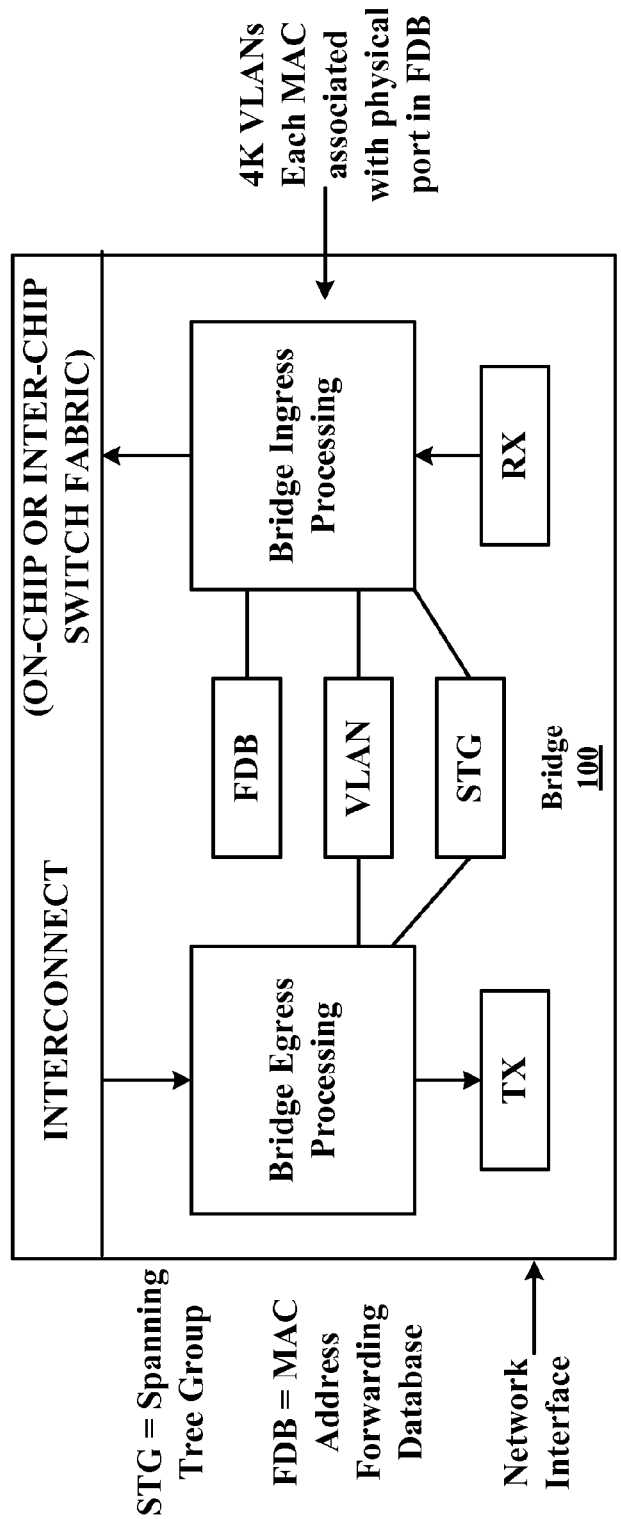
FIG. 1 is a simplified functional block diagram illustrating several components of a conventional network bridge.

Embodiments of the present invention may have utility in the field of network switches such as, for example, Ethernet switches. The disclosed system and method may be employed in connection with various local area network (LAN) applications and architectures that support virtual networking strategies such as virtual LAN (VLAN), virtual private network (VPN), and virtual private LAN service (VPLS) technologies. It is noted that a layer 2 VPN may be implemented using VPLS techniques.

A switch may be a boundary (or edge) device disposed between two types of networks in some applications. For example, a switch may bridge a service provider backbone network (e.g., that forwards traffic based on traffic service) and an access network (e.g., that forwards traffic based on user ID). Aspects of the present invention are generally directed to such switching devices that execute bridging functionality and allow data communication across disparate network domains.

While the following description addresses a situation in which a "customer" network is in network communication with a "service provider" (generally wider area) network, the present disclosure is not intended to be limited in that regard. In particular, the system and method described herein may have utility in any application in which a packet is transmitted from a first network domain to a second network domain. In addition to the situation in which a customer and a service provider each maintain independent network domains, for example, a corporation or educational institution may provide independent virtual or logical networks (i.e., subnetworks) for various groups or departments within a company or university; this may be true even where the company or university employs a single physical network (i.e., an enterprise network). In this situation, a unique VLAN may be assigned to each independent department; edge devices (i.e., bridges) on the enterprise network may then be configured to insert an appropriate VLAN tag into all data frames or packets ingressing the enterprise network from equipment determined to be associated with a given department subnetwork. After a packet is switched through the enterprise network, the enterprise network VLAN tag may be stripped before the packet is transmitted back to the department equipment. It will be appreciated that the system and method of logical bridging set forth herein are not limited to any particular network architecture or topography.

In general, operational characteristics of a standard bridge are defined by various standards such as the IEEE 802.1Q standard or others promulgated by the International Engineering Task Force (IETF), for example. In some instances, carrier layer 2 VPN (L2VPN) technologies may implement a logical bridge on top of a layer 2 or layer 3 infrastructure network; examples of such technologies include VPLS, MAC-in-MAC, and certain emerging wireless LAN (WLAN) standards. In accordance with these strategies, standard bridging concepts are replaced with L2VPN counterparts to facilitate packet switching over a common infrastructure while maintaining segregation of traffic between customers or subnetworks. In particular, a physical port is generally replaced with a customer attachment circuit (also known as a pseudo-wire (PW) or logical port), and a VLAN flood domain is replaced with a VPN flood domain.

In accordance with the system and method set forth herein, the foregoing and most other standard bridging concepts and requirements may be preserved. These include, but are not limited to, source port filtering, spanning tree protocol, media access controller (MAC) address learning (both automatic and controlled), and per-PW: unknown user class (UC); unregistered multipoint controller (MC); and broadcast rate limiting. Additionally, the logical bridging functionality may be extended to include new concepts and requirements, such as split horizon protocols for VPLS and per-PW control of unknown and unregistered traffic.

To support and extend logical bridging functionality, it may be desirable to identify a particular service instance with which a particular packet is associated and to assign the packet to that particular service instance for internal switching purposes. In this context, a service instance is generally employed to distinguish between service domains to which a packet is to be forwarded; in accordance with an embodiment, no traffic may be allowed to pass between different service domains. Additionally, it may be desirable to assign a customer attachment identifier to the packet. In this context, a customer attachment identifier is generally employed to distinguish different sources that are communicating on the same physical port or interface. For example, if the destination address of a packet cannot be identified from a database or table lookup operation, then the packet is generally flooded to every egress interface in the flood domain, except the source interface at which it was received. When a bridge receives a packet, it associates the packet source address and VLAN identification (VID) with the physical port at which the packet was received. In that regard, a logical bridge may attempt to associate a packet source address and service instance with a customer attachment identifier (e.g., a logical port or PW). Once the address is "learned," when another device sends traffic destined to that address, the packet will be forwarded to the correct customer attachment interface. Further, when a packet is received at an edge device, it may be tunneled to another edge device in accordance with the customer attachment interface associated with the destination address. Accordingly, it may be desirable to implement a "split horizon" protocol that forwards network traffic to appropriate customers—but not to unnecessary edge devices—as set forth in more detail below.

Implementation

In a standard bridging implementation, the bridge uses certain source information associated with an ingressing packet to determine how to handle the packet. In a bridge comprising multiple devices, the source information is generally related to a source device (i.e., the entity that originally transmitted the packet to the bridge) and source port (i.e., the physical port at which the packet ingressed). In a logical bridging strategy as contemplated herein, such source information may be enhanced to include information or data related to a logical port associated with a given packet. In the context of the present disclosure, a logical port is, for logical bridging applications, analogous to a physical port for a standard bridge. For an ingressing packet, a logical port may be determined by a lookup engine that accesses a table or database where a lookup key may be based upon a physical port at which the packet ingressed, one or more fields associated with a packet header, or a combination of these or other characteristics of the packet. In some implementations, every customer attachment point may be assigned a unique source logical port.

Figure 2:
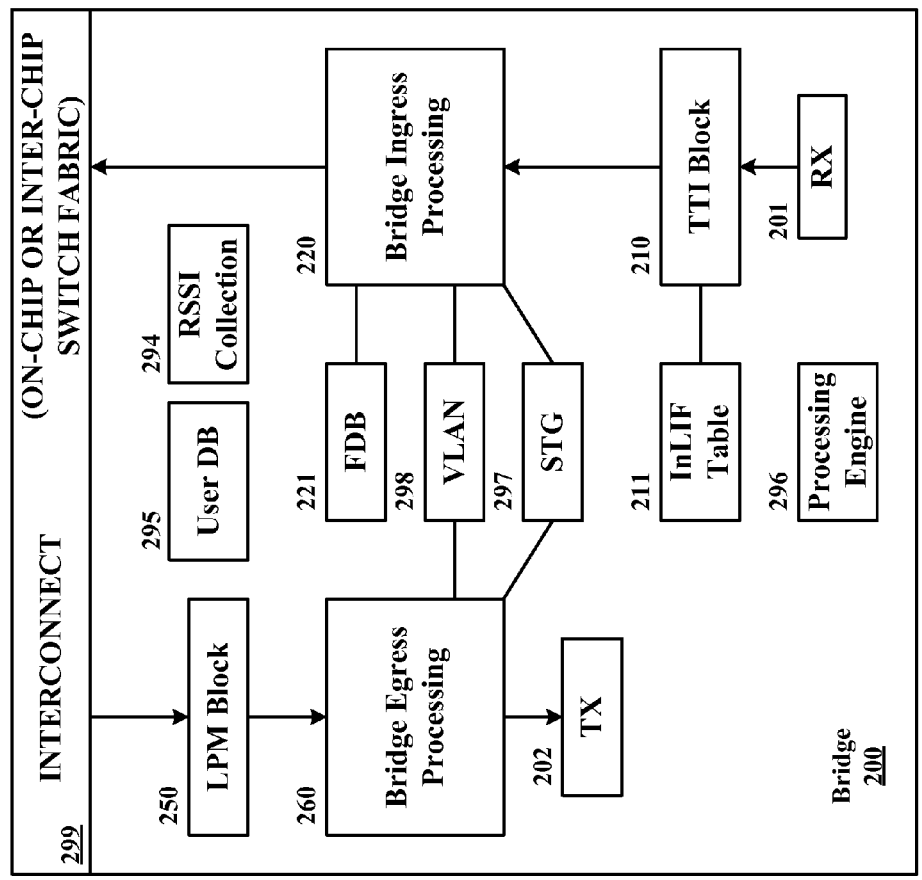
FIG. 2 is a simplified functional block diagram illustrating components of one embodiment of a logical bridge.

Turning now to the drawing figures, FIG. 1 is a simplified functional block diagram illustrating several components of a conventional network bridge, and, by way of comparison, FIG. 2 is a simplified functional block diagram illustrating components of one embodiment of a logical bridge. While sharing certain components (such as VLAN tables 298 and spanning tree group 297 blocks) and features with conventional bridge 100, logical bridge 200 additionally comprises a tunnel termination interface (TTI) block 210, an Input Logical Interface (InLIF) table 211, and a Logical Port Mapping (LPM) block 250. It will be appreciated that the components illustrated in FIG. 2 may be implemented in a single, monolithic integrated circuit (IC) or an application specific IC (ASIC), for instance. Alternatively, it may be desirable in some instances that some of the components, such as InLIF Table 211, forwarding database (FDB) 221, or both may be implemented independently (e.g., on a separate chip or ASIC) of the other components.

Processing engine 296 may be embodied in or comprise a microprocessor, microcontroller, microcomputer, or any other type of data processor or hardware element suitably configured to control or otherwise to enable switching operations and to support the functionality of the other components as set forth below. Further, it is noted that bridge 200 may comprise additional components not illustrated in FIG. 2 for clarity. For example, multiple switch ports for ingressing and egressing packets are not illustrated.

An ingress pipeline is illustrated on the right side of FIG. 2, while an egress pipeline is illustrated on the left side. Upon ingress at a physical ingress port, a packet may be passed to a receiver (RX) block 201 to begin the ingress processing. As an alternative, RX block 201 may itself comprise the physical port or a number of physical ports. Various hardware register settings, packet header fields or parameter values, and other mechanisms may be employed by the physical port, RX block 201, or both, to influence subsequent processing operations as is generally known. Upon reception and any attendant preliminary processing executed by RX block 201, an ingressed packet may be forwarded to TTI block 210. In an embodiment, TTI block 210, Bridge Ingress Processing block 220, LPM block 250 and Bridge Egress Processing block 260 form, at least in part, a packet processor, the packet processor being coupled between RX block 201 and transmitter (TX) block 202 (as shown in FIG. 2) and processing packets such as performing the functionality described below with reference to blocks 210, 220, 250 and 260.

In operation, TTI block 210 may parse a packet to determine its content and build a search key (e.g., a data structure indicative of the packet content) that may then be employed to access a database or table from which a logical port and a service instance may be extracted. It will be appreciated that TTI block 210 may be embodied in or comprise a hardware engine suitably configured to support this functionality; alternatively, software or firmware may be employed so that TTI block 210 may be selectively programmable or reconfigurable.

Figure 3:
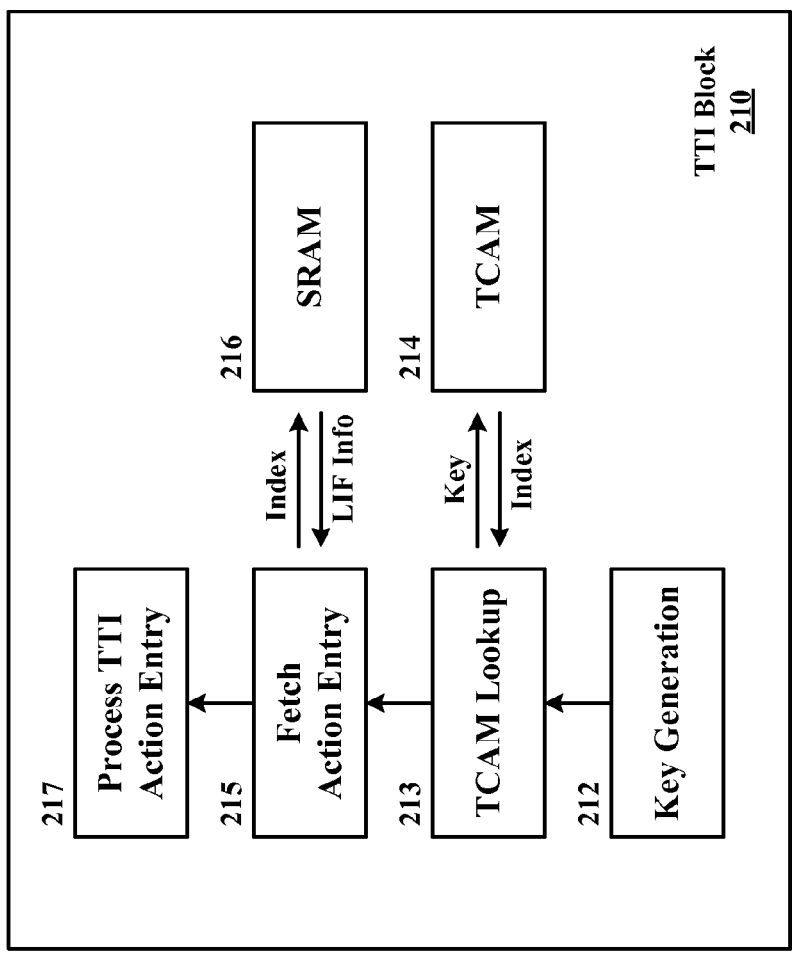
FIG. 3 is a simplified functional block diagram illustrating components of one embodiment of a tunnel termination interface.

In that regard, FIG. 3 is a simplified functional block diagram illustrating components of one embodiment of a tunnel termination interface. TTI block 210 may generally be operative to identify the structure of an ingressing packet based, for example, on the characteristics of packet content, and to assign a logical port identifier and a service instance to the ingressing packet according to those characteristics. As illustrated in FIG. 3, TTI block 210 may generally comprise a key generation block 212, a ternary content addressable memory (TCAM) lookup block 213, a fetch action entry 215, and a process action entry block 217. Additionally, TTI block 210 may comprise or otherwise have access to memory such as TCAM 214 and static random access memory (SRAM) 216; as an alternative to integrating TCAM 214 and SRAM 216 in TTI block 210 itself as depicted in FIG. 3, it may be desirable in some instances to implement these memories off-chip and to enable TTI block 210 selectively to access these components as required.

Key generation block 212 may parse an ingressing packet and construct a key as described above. Following generation of an appropriate key, logical ports and service instances may be identified in various ways. In that regard, TTI block 210 may employ or access a table of rules, e.g., using the key as an index, to determine how to handle a particular packet. For instance, the key (and thus a table lookup operation) may be based upon any of various factors including, but not limited to: the physical port at which a packet ingressed bridge 200; whether the packet is tagged; field values associated with an outer tag of the packet (e.g., VID and priority); and values associated with the VID and priority fields of an inner tag of the packet. In some implementations, the lookup key may be based upon the physical port at which the packet was ingressed and one or more VID tags in the packet (e.g., Ethernet edge, or Q-in-Q access network). Additionally or alternatively, assignment of logical port identification and service instance may be based on one or more multiprotocol label switching (MPLS) labels in the packet (e.g., MPLS edge, or Martini tunnels), a MAC-in-MAC header, or an Internet Protocol (IP) tunnel header in the packet.

Given some or all of this information to be used in constructing the key, TCAM lookup block 213 may consult a table, database, or other data library maintained in a memory component (such as TCAM 214) to identify a table entry or database record that matches, or closely approximates, the format and structure of the ingressed packet. In the FIG. 3 embodiment, table entries are maintained in TCAM 214 engine, though the present disclosure is not intended to be so limited. Following the lookup, TCAM 214 may return an index as illustrated in FIG. 3. This index may be employed by fetch action entry block 215 to access SRAM 216 to retrieve an action entry related to InLIF information for the packet. In that regard, a logical port identifier and a service instance for the packet may be retrieved from SRAM 216; additionally, instructions may be retrieved regarding how to process the packet in accordance with such InLIF information. For example, where a packet is to be processed in accordance with logical bridging techniques, TTI action entry information retrieved from SRAM 216 (e.g., based upon an index provided by TCAM 214) may include, in addition to the source logical port identifier and service instance, quality of service (QoS) and other information associated with how to process the packet. SRAM 216 may maintain action entries in a table or suitable database structure; the manner in which fetch action entry block 215 accesses or queries SRAM 216 may depend upon the character and implementation of the data structure.

In practical applications, a memory component such as SRAM 216 maintaining InLIF information may be embodied in or comprise any type of data storage (such as dynamic RAM (DRAM) and other known memory types) having sufficient capacity and accessibility parameters (such as read and write access times) suitable to support operations of TTI block 210 and the forwarding functionality set forth herein. As noted above, SRAM 216 may maintain a table of action entry items containing instructions regarding how to process particular packet types. Process TTI action entry block 217 may subsequently perform operations or issue instructions responsive to the action entry information retrieved from SRAM 216. It will be appreciated that where sufficient data storage and appropriate access parameters are provided, TTI block 210 may not need to access separate memories such as TCAM 214 and SRAM 216 in different lookup operations. This is illustrated in FIG. 2, where InLIF table 211 may maintain the data structures collectively maintained in TCAM 214 and SRAM 216. In the FIG. 2 embodiment, a single functional component of TTI block 210 (such as fetch action entry block 215) may access a single table to retrieve necessary or desired information regarding a packet based upon some or all of the information described above with reference to constructing keys. Alternatively, TCAM 214 and SRAM 216 may be integrated into a single block (such as InLIF table 211) having different logical memory areas in some implementations.

Data retrieved from SRAM 216 (in FIG. 3) or from InLIF table 211 (in FIG. 2) may be employed to assign an InLIF-ID to each ingressed data packet. The InLIF-ID may be associated with the source logical port and service instance assigned to the packet, and may further provide an indication regarding whether logical bridging is required or desired for the packet. For example, in instances where a packet is not to be processed according to logical bridging, the InLIF-ID may provide an indication to downstream components that conventional bridging techniques should be employed to process the packet. In the alternative, the InLIF-ID may provide an indication that a packet is to be handled in accordance with the logical bridging techniques described herein, and additionally may provide an indication of (or be readily associated with) the source logical port and service instance assigned to the packet. Additionally, the InLIF-ID may include an indication of the VID for the packet.

In the foregoing manner, TTI block 210 may function as a classification engine to classify a packet for subsequent processing. Using a key based upon packet characteristics, TTI block 210 generally may determine, among other parameters, a logical port and a service instance associated with the packet. A packet descriptor such as the InLIF-ID may be associated with the data packet to influence switching behavior; additionally or alternatively, a packet header may be modified to include information regarding the source logical port and service instance assignments. This information may be employed by a bridging engine to forward the packet substantially as set forth below.

Bridge ingress processing block 220 may make forwarding decisions, for example, using FDB 221 and InLIF information provided by TTI block 210. In that regard, FDB 221 may correlate several variables having utility in making forwarding decisions. In one embodiment, FDB 221 may comprise entries based upon VID and MAC address, for instance; lookup operations based upon MAC address and VID have utility in standard bridging operations. In accordance with some embodiments of logical bridging methodologies, it may be desirable to configure FDB 221 to associate InLIF information with MAC addresses and VID information. In particular, table entries or database records may be extended to include fields associated with InLIF-ID, logical port identification, service instance, or a combination of these.

Bridge ingress processing block 220 may perform one or more lookup operations with respect to FDB 221 to determine how to handle a packet in accordance with the logical port identifier and the service instance information assigned to the packet. In particular, it may be desirable that a lookup algorithm employ a MAC address and an InLIF-ID to perform a lookup operation with respect to FDB 221. A MAC destination address (DA) may be employed for forwarding operations, while a MAC source address (SA) may be employed for learning operations; in this instance, it will be appreciated that automatic learning may be based upon a logical port identifier rather than a physical port.

By employing an InLIF-ID as a variable for accessing FDB 221, it is possible to increase the number of VLANs recognized by bridge 200 from 4 k to 64 k or greater. In one embodiment, 64 k VPNs may be recognized. In this case, an InLIF-ID may serve as a VPN identification (VPN-ID) logically to separate FDB entries by service instance. For example, a standard VID field is 12 bits, while an InLIF-ID field may be 16 bits or greater in some embodiments. The additional bits in the InLIF-ID field may be employed to allow bridge 200 to identify many more service instances than it otherwise could using VID fields.

Further, as noted above, employing InLIF-ID fields in FDB 221 enables bridge 200 to implement MAC address learning based upon a source logical port rather than a source physical port. In that regard, a source logical port associated with a packet may be decoupled from the source physical port. Similarly, the bridge forwarding decision for a destination address may be based upon identification of a logical port which is decoupled from the actual physical egress port.

Bridge ingress processing block 220 may pass the processed packet through interconnect 299 to the egress pipeline illustrated at the left side of FIG. 2 as is generally known. As indicated in FIG. 2, interconnect 299 may be embodied in or comprise an on-chip or inter-chip switch fabric such as are generally operative to connect multiple devices. The present disclosure is not intended to be limited to any particular structural arrangement or hardware implementation employed at interconnect 299.

It is noted that some or all of the foregoing functionality may be integrated into a single functional block. For example, while TTI block 210, InLIF table 211, bridge ingress processing block 220, and FDB 221 are represented in FIG. 2 as discrete components for clarity, their respective functionalities may be incorporated into a single logical or functional block depending, for instance, upon practical limitations such as silicon or chip real estate constraints, heat dissipation requirements, relative complexities associated with fabrication, configuration, or both, or a combination of these and other factors.

Upon egress, bridge 200 may be required to transmit a packet to multiple locations, i.e., a single packet may be replicated a number of times. For example, broadcast and multicast packets must be transported multiple times; where the MAC DA for a packet is unknown or not stored in FDB 221, the packet must be flooded to every port in the flood domain. Generally, the most efficient way to implement such replication is to replicate once to every device in the system, and then to allow each device to replicate as necessary to its ports or local interfaces. In the illustrated embodiment of bridge 200, LPM block 250 may be responsible for such local multicast replication, and may also facilitate processing of logical bridge packets to the extent that it may provide additional information that is related to an egress interface.

For example, as noted above, a packet received at an edge device for transmission across a provider network to a customer network domain may generally have a VLAN field and MAC field in a packet header. In some customer or subnetwork implementations, it may be necessary to modify the VLAN field (e.g., depending upon the VLAN associated with the MAC DA) or to multicast the packet to destination devices in different VLANs. It is noted that modification of a packet header may occur upon ingress to the provider network or upon egress from the provider network. LPM block 250 may maintain information allowing a packet header to be appropriately manipulated to facilitate such multicast operations. In some implementations, LPM block 250 may manipulate the packet independently or in cooperation with bridge egress processing block 260. In particular, LPM block 250 may enable control of tagging for customer networks or other subnetwork implementations. To support this functionality, LPM block 250 may be embodied in or comprise a lookup table, database, or other suitable data structure correlating InLIF information, VIDs, MAC addresses, and customer VLAN tagging preferences. Additionally, LPM block 250 may point to a tunnel start entry which provides information regarding the required external header for a packet; in that regard, a tunnel start entry may define a tunnel to be used to transmit the packet across the provider network.

Further, certain split horizon protocols dictate that an ingress edge device may be required to flood an incoming packet to customer interfaces but not to other provider interfaces. In some implementations, the filtering mechanism enabling split horizon may be integrated into LPM block 250. For example, TTI block 210 may assign an attribute or packet descriptor that indicates whether an ingress interface for the packet that is currently being processed is associated with a provider edge device. This attribute may be associated with the InLIF-ID, for example, and may be related to the logical port identification, the service instance, or both. Each table entry or database record in LPM block 250 may identify whether an egress interface is associated with a provider edge device. If the downstream interface is a provider edge device, and the attribute associated with the InLIF-ID identifies the ingress interface as a provider edge device, the packet may not be forwarded to the downstream edge device (i.e., it may be dropped); alternatively, if the ingress interface is not associated a provider edge device, then the packet may be forwarded in accordance with other information maintained in LPM block 250.

LPM block 250 may also enable logical source port filtering. For example, a logical port identifier assigned by TTI block 210 may be compared with a logical port associated with each table entry or database record in LPM block 250. If the retrieved entry from LPM block 250 identifies a logical egress port that matches the logical ingress port, the packet may not be flooded back to the ingress local port.

Figure 4:
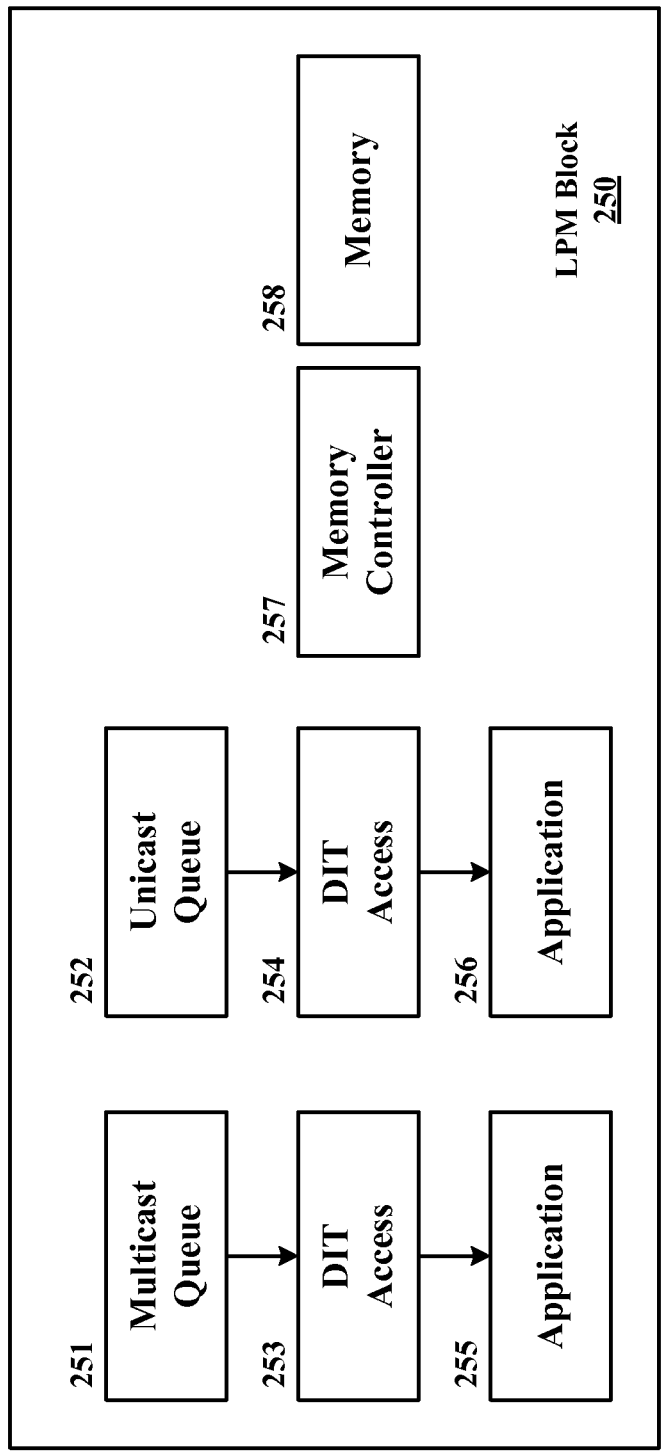
FIG. 4 is a simplified functional block diagram illustrating components of one embodiment of a logical port mapping element and illustrating operation of a portion of one embodiment of an egress pipeline for logical bridging in virtual network applications.

FIG. 4 is a simplified functional block diagram illustrating components of one embodiment of a logical port mapping element and illustrating operation of a portion of one embodiment of an egress pipeline for logical bridging in virtual network applications. LPM block 250 generally comprises a multicast queue 251 and a unicast queue 252 to buffer packets for processing. Broadcast, multicast, and flooded packets may be queued for processing at block 251, while unicast packets may be queued for processing at block 252 as is generally known. To provide rapid and efficient processing of unicast packets, these may be given high priorities; accordingly, queue 252 may be appreciably smaller (e.g., in terms of memory capacity or chip real estate) than queue 251. Downstream Interface Table (DIT) access blocks 253 and 254 may be employed to access table entries or database records (i.e., the downstream interface table) related to one or more egress interfaces for a packet as set forth above. Such information regarding egress interfaces may be stored in memory 258; a memory controller 257 may facilitate access to memory 258. Memory 258 may be implemented in SRAM, DRAM, or any other suitable data storage medium. Implementation of memory controller 257 may be influenced by the type of technology employed at memory 258, the characteristics of the data structure employed, or a combination of these and other factors. It is noted that it may be desirable in some instances to implement memory 258 off-chip, i.e., independent of LPM block 250.

Returning now to FIG. 2, bridge egress processing block 260 may pass packets to a TX block 202 for egress. Processing operations at block 260 may include mapping the logical egress interface to a physical port from which a packet is to be egressed. Optionally, a tunnel interface may be applied to the packet at this stage, such as by adding a tunnel header. This logical port mapping engine functionality is supported by the correlation of MAC DA, VID, and LIF information maintained in memory at, or accessible by, LPM block 250.

Returning now to FIG. 2, bridge egress processing block 260 may pass packets to a transmitter (TX) block 202 for egress. Processing operations at block 260 may include mapping the logical egress interface to a physical port from which a packet is to be egressed. Optionally, a tunnel interface may be applied to the packet at this stage, such as by adding a tunnel header. This logical port mapping engine functionality is supported by the correlation of MAC DA, VID, and LIF information maintained in memory at, or accessible by, LPM block 250.

As noted above with reference to RX block 201, TX block 202 may comprise physical ports through which packets may be egressed from bridge 200. As an alternative, TX block 202 may be coupled to one or more physical ports. Various hardware register settings, packet header fields or parameter values, and other mechanisms may be employed by the physical port, TX block 202, or both, to influence transmission of packets as is generally known. For example, a tag protocol identification (TPID) field may be set by TX block 202, e.g., based upon hardware register settings or other mechanisms. The TPID field may be employed downstream (e.g., upon ingress at a downstream switch) and serve as an indication of whether a particular packet is tagged.

In the foregoing manner, bridge ingress processing block 220 and bridge egress processing block 260, in cooperation with FDB 221 and LPM block 250, may function as a bridging engine to process packets in accordance with logical interface information. As noted above, the logical port mapping functionality of bridge 200 may decouple logical ports from physical ports such that the bridging engine may process packets through bridge 200 using only logical port information. Following substantive processing, the logical port may be mapped to a physical egress port in a straightforward manner.

Figure 5:
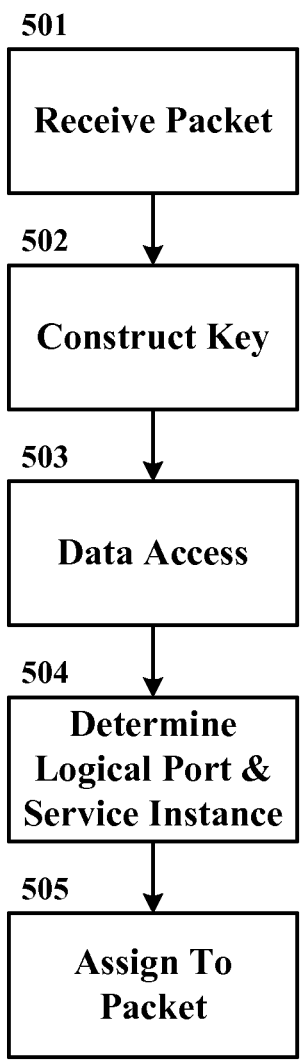
FIG. 5 is a simplified flow diagram illustrating operation of a portion of one embodiment of an ingress pipeline for logical bridging in virtual network applications.

FIG. 5 is a simplified flow diagram illustrating operation of a portion of one embodiment of an ingress pipeline for logical bridging in virtual network applications. It is noted that the operations depicted in FIG. 5 may be executed by components of a bridge 200 such as illustrated in FIGS. 2-4 or other suitably configured network switching devices.

A packet may be received at a physical port as indicated at block 501. In some embodiments, a method of processing the packet may continue with constructing a key at block 502; as noted above, the key may be a data structure representative of certain characteristics of the packet. The key may be generated by parsing the packet, and may be based upon the physical port at which the packet was ingressed, one or more VID tags in the packet, MPLS labels, or other packet characteristics.

The key may be used as an index to access data as indicated at block 503. This operation may include a table or data library lookup operation, a database query, or some other suitable mechanism operative to retrieve information based upon the key. In the embodiment illustrated in FIG. 3, the data access operation depicted at block 503 includes two independent look up steps, though the present disclosure is not intended to be so limited. A table entry or other data record accessed via the key may include fields associated with a logical port and a service instance for the packet. A classification engine may therefore determine the source logical port and service instance (block 504) to be assigned to the packet (block 505) for internal processing. The assigning operation at block 505 may include providing a packet descriptor representative of a logical port, a service instance, an InLIF-ID, or other indication of LIF information associated with the packet. In some instances, the packet descriptor may include one or more fields in a packet header; as an alternative, it may be desirable to assign a packet descriptor indicative of the foregoing information without modifying the packet header. Subsequent processing through the bridge need not rely upon the physical ports at which the packet ingresses or egresses.

The foregoing bridging hardware and methodologies may be implemented in connection with wireless networks, wired networks, or both. For example, logical bridging using InLIF information and logical egress port mapping may be employed in connection with the IEEE 802.11 standard for WLANs and with Control and Provisioning of Wireless Access Points (CAPWAP), a protocol defined by IETF.

Figure 6:
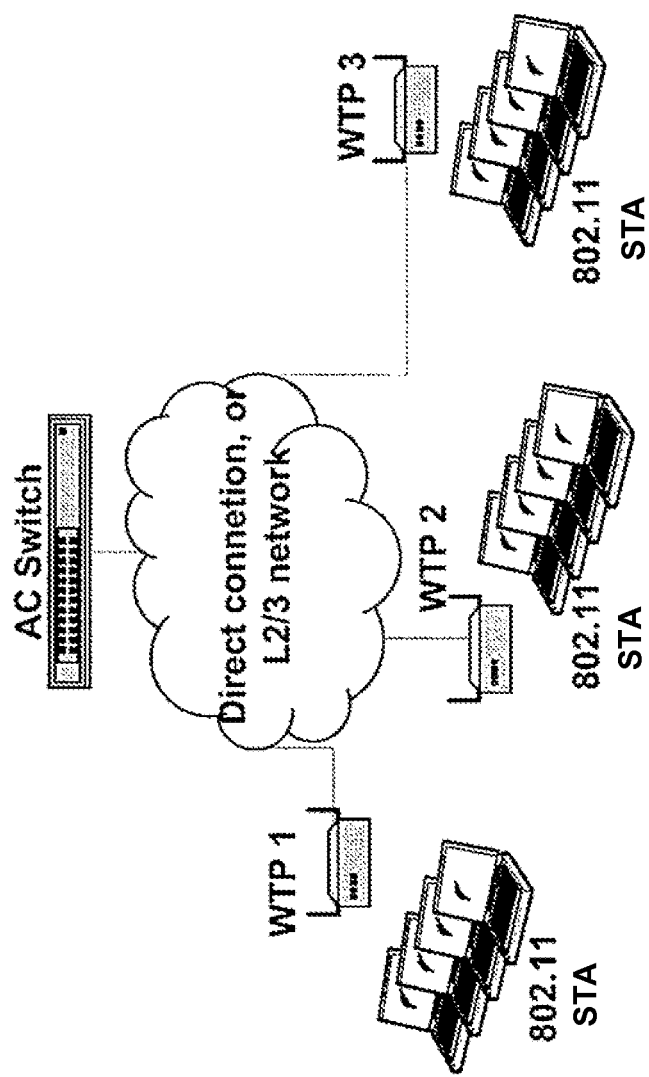
FIG. 6 is a simplified high level block diagram illustrating one example of a network architecture in which logical bridging may be employed.

FIG. 6 is a simplified high level block diagram illustrating one example of a network architecture in which logical bridging may be employed. As illustrated in FIG. 6, a CAPWAP architecture comprises three main entities: access controllers (ACs); wireless termination points (WTPs), commonly referred to as access points; and stations (STAs).

The AC is the entity that provides WTPs access to the network infrastructure in the data plane, the control plane, the management plane, or a combination of these. The WTPs are the physical entities that contain RF antennae and wireless PHYsical layer protocol (PHY) interfaces to transmit and receive STA traffic for various wireless access networks (such as WLANs). The STAs are the devices that contain an IEEE 802.11 conforming MAC and PHY interface enabling access to the wireless medium.

In FIG. 6, a single AC is responsible for managing multiple WTPs and a set of STA associated with each WTP. All of the WTPs, as well as the AC, are generally coupled to a wired network. The connection between the WTPs and the AC may be a direct connection or a logical connection over a layer 2 bridged network or a layer 3 routed network. The CAPWAP standard generally employs User Datagram Protocol (UDP) as a transport and may be implemented in connection with IPv4 or IPv6 as the tunneling protocol. Two CAPWAP tunnels may be established between a WTP and the AC: one is a control channel tunnel used for transporting CAPWAP control messages; and one is a data channel tunnel used for transporting 802.11 frames to and from STAs. The UDP destination port may be used to distinguish between the control tunnel and the data tunnel. Specifically, CAPWAP and other standards for integrating wireless traffic with wired traffic (such as Light Weight Access Point Protocol (LWAPP)) generally dictate that wireless traffic will be tunneled to and from a WLAN switch in a wired network.

In accordance with the techniques disclosed herein, CAPWAP, LWAPP, or other wireless networking protocol tunnels may be treated as logical ports substantially as set forth above. A data packet may be assigned a logical port identifier upon ingress (i.e., a logical ingress port) as set forth above. Upon egress, a logical egress port may be assigned and the packet header may be modified; as an alternative, a packet descriptor may be associated with the packet that provides an indication of the logical ingress or the logical egress port. This packet descriptor may be part of the packet header or it may be independent of the packet header. Based upon the logical egress port identifier, the packet may be mapped to a particular physical port, to a particular tunnel associated with a particular port, or both. If the packet is to be encapsulated in a tunnel, it may be modified to include a tunnel header or interface when it egresses the physical interface.

When an 802.11 (or other standard) WLAN access point device receives packets from WLAN stations, each data packet is generally associated with an index called a Received Signal Strength Indicator (RSSI). In use, RSSI values may be employed by intelligent applications for discovering the location of WLAN stations, for instance, for optimizing the locations of access points, and for other purposes. As noted above, when integrating WLAN traffic into a wired LAN, industry standard protocols such as LWAPP or CAPWAP typically define a tunnel encapsulation to transport the WLAN traffic to a WLAN switch in the wired network. The tunnel encapsulation header generally carries the RSSI value detected by the access point to the WLAN switch; accordingly, RSSI information is carried in every packet sent by the access point to the WLAN switch.

Referring to FIGS. 2 and 6, it is noted that bridge 200 may be implemented as the AC illustrated in the FIG. 6 architecture. When WLAN traffic from a wireless access point arrives at bridge 200, packets may be processed and forwarded in the hardware datapath of bridge 200 in accordance with assigned InLIF data substantially as set forth above. Since the RSSI value appears in the tunnel header encapsulation of every packet from the access point, it may be desirable for the hardware datapath of bridge 200 to maintain a weighted average of users' WLAN traffic, and to alert processing engine 296 when a station's RSSI falls below a configurable threshold. In that regard, bridge may comprise a user database (DB) 295 and an RSSI collection module 294. DB 295 and RSSI collection module 294 may be integrated in TTI block 210 in some implementations.

DB 295 may be a hardware-based WLAN user database maintaining records for all wireless STAs coupled to the network. Individual WLAN users may be identified based on the WLAN packet MAC SA, for instance, or based upon some other characteristic of the packet, including but not limited to InLIF-ID or other LIF information.

In one implementation, each entry in DB 295 contains an RSSI weighted average (updated on every packet received from that user), and a "RSSI profile." The RSSI Profile is a 3-bit index into an 8 entry RSSI Profile Table. Each RSSI Profile table entry contains a weight between 0 and 1, exclusively. The profiles allow WLAN traffic from different access points (or from different WLAN technologies) to have different weights applied during the RSSI weighted average calculation.

For each incoming WLAN packet, an RSSI value may be extracted by RSSI collection module 294, a weighted average of the RSSI may be calculated, and the DB 295 may be updated accordingly. These operations may be supported by or executed by processing engine 296.

In accordance with one embodiment, the RSSI average may be updated with the following calculation, where the new RSSI weight average is expressed as:

$$\text{profile<weight>} * \text{<previous RSSI>} + (1 - \text{profile<weight>}) * \text{Packet<RSSI>}$$

As the weight approaches 1, the new RSSI weighted average is less sensitive to the RSSI of new packets, i.e., the new RSSI weighted average changes very slowly to reflect the RSSI value in newly received packets. As the weight approaches 0, the new RSSI weighted average is more sensitive to the RSSI of new packets, i.e., the new RSSI weighted average changes very quickly to reflect the RSSI value in newly received packets.

In order to alert processing engine 296 that a station's RSSI has fallen below a configurable threshold, the RSSI Profile table entry may contain two RSSI alert threshold values: a minimum packet RSSI threshold; and a minimum weighted average RSSI threshold. In the event that either the packet RSSI or the weighted average RSSI falls below the associated threshold, the MAC SA and its associated RSSI value may be copied to RSSI exception registers for reading by processing engine 296. In some embodiments, the contents of such RSSI exception registers cannot be overwritten by subsequent events until they are read by the processing engine 296.

In the foregoing manner, bridge 200 may maintain detailed information regarding signal strength in wireless networks coupled to a wired network. This information may be accessed by various applications, for example, to identify locations of wireless stations or to optimize locations of access points.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A network device, comprising:
a plurality of physical ports configured to be coupled to one or more networks; and
a packet processor coupled to the physical ports of the plurality of physical ports and configured to process packets received via one or more source physical ports of the plurality of physical ports, the packet processor comprising
a processor configured to implement a logical port assignment mechanism to assign source logical port information to a data packet received via a source physical port of the one or more source physical ports, wherein the source logical port information is assigned based on one or more characteristics of the data packet, and wherein the source logical port information corresponds to a logical entity that is different from any physical port, and wherein the packet processor is configured to perform additional processing of the data packet using the source logical port information assigned to the data packet, and
a forwarding engine processor coupled to the processor configured to implement the logical port assignment mechanism, wherein the forwarding engine is configured to further process the data packet processed by the processor configured to implement the logical port assignment mechanism, including (i) determining one or more egress logical ports for forwarding the data packet, (ii) mapping the one or more egress logical ports to respective one or more egress physical ports of the plurality of physical ports, and (iii) forwarding the data packet to the one or more egress physical ports determined based on the mapping;
wherein the packet processor is further configured to cause the data packet to egress via the one or more egress physical ports to which the data packet was forwarded by the forwarding engine.

2. The network device of claim 1, wherein the forwarding engine processor is configured to perform the additional processing of the data packet using the source logical port information, and wherein the additional processing includes determining the one or more egress logical ports for forwarding the data packet based on at least the source logical port information.

3. The network device of claim 1, wherein the forwarding engine processor is configured to map at least one of the one or more egress logical ports to a tunnel interface to be applied to the data packet.

4. The network device of claim 1, wherein the forwarding engine processor is configured to learn an address based on the assigned source logical port information.

5. The network device of claim 4, wherein the address is a source media access control (MAC) address included in the data packet.

6. The network device of claim 1, wherein the logical port assignment mechanism provides an indication of the source logical port information in a packet descriptor that is associated with the data packet.

7. The network device of claim 1, wherein the logical port assignment mechanism provides an indication of the source logical port information in a packet header of the data packet.

8. The network device of claim 7, wherein the logical port assignment mechanism assigns the source logical port information to the data packet based on at least one or more of (i) the source physical port, (ii) one or more virtual local area network identifier (VID) tags in the data packet, (iii) one or more multiprotocol label switching (MPLS) labels in the data packet, (iv) media access control (MAC) header information in the data packet, or (v) Internet Protocol (IP) header information in the data packet.

9. The network device of claim 1, wherein at least a portion of the packet processor is configured to execute machine-readable instructions, stored in a memory, to perform processing of the packets received via one or more source physical ports of the plurality of physical ports.

10. The network device of claim 9, wherein the processor is configured to execute machine-readable instructions, stored in the memory, to implement the logical port assignment mechanism.

11. A method comprising:
assigning, by a network device and based on one or more characteristics of a data packet received via a source physical port of a plurality of physical ports of the network device, source logical port information to the data packet, wherein the source logical port information corresponds to a logical entity that is different from any physical port;
performing, by the network device, additional processing of the data packet using the source port logical information assigned to the data packet;
determining, by the network device, one or more egress logical ports for forwarding the data packet;
mapping, by the network device, the one or more egress logical ports to respective one or more egress physical ports of the plurality of physical ports; and
forwarding the data packet to the one or more egress physical ports based on the mapping.

12. The method of claim 11, further comprising mapping, by the network device, at least one of the one or more egress logical ports to a tunnel interface to be applied to the data packet.

13. The method of claim 11, further comprising learning, by the network device, an address based on the assigned source logical port information.

14. The method of claim 11, wherein assigning the source logical port information to the data packet is based on at least one or more of (i) the source physical port, (ii) one or more virtual local area network identifier (VID) tags in the data packet, (iii) one or more multiprotocol label switching (MPLS) labels in the data packet, (iv) media access control (MAC) header information in the data packet, or (v) Internet Protocol (IP) header information in the data packet.

15. A network device comprising:
a receiver block configured to couple to at least one source physical port;
a transmitter block configured to couple to at least one egress physical port;
a packet processor, coupled to the receiver block and to the transmitter block, and configured to process packets received via one or more of the at least one source physical port, the packet processor comprising
a processor configured to implement a logical port assignment mechanism to assign source logical port information to a data packet received via one of the one or more source physical ports, wherein the source logical port information is assigned based on one or more characteristics of the data packet, wherein the source logical port information corresponds to a logical entity that is different from any source physical port, and wherein the packet processor is configured to perform additional processing of the data packet using the source logical port information assigned to the data packet, and
a forwarding engine processor coupled to the processor configured to implement the logical port assignment mechanism, wherein the forwarding engine processor is configured to further process the data packet processed by the processor configured to implement the logical port assignment mechanism, including determining at least one of (i) one or more egress physical ports, or (ii) one or more egress logical ports, for forwarding the data packet;
wherein the packet processor is further configured to cause the data packet to egress via at least one of (i) the one or more egress physical ports determined by the forwarding engine processor or (ii) one or more egress physical ports corresponding to the one or more egress logical ports determined by the forwarding engine.

16. The network device of claim 15, wherein the forwarding engine processor is configured to (i) determine the one or more egress logical ports, (ii) map each of the one or more egress logical ports to a respective one or more egress physical ports of the at least one egress physical port, and (iii) forward the data packet to the one or more egress physical ports based on the mapping.

17. The network device of claim 16, wherein the forwarding engine processor is configured to map at least one of the one or more egress logical ports to a tunnel interface to be applied to the data packet.

18. The network device of claim 15, wherein the forwarding engine processor is configured to learn an address based on the assigned source logical port information.

19. The network device of claim 15, wherein at least a portion of the packet processor is configured to execute machine-readable, stored in a memory, to perform processing of the packets received via one or more source physical ports of the plurality of physical ports.

20. The network device of claim 19, wherein the processor is configured to execute machine-readable instructions, stored in the memory, to implement the logical port assignment mechanism.

21. A method comprising:
assigning, by a network device and based on one or more characteristics of a data packet received via a source physical port of the network device, source logical port information to the data packet, wherein the source logical port information corresponds to a logical entity that is different from any source physical port;
performing, by the network device, additional processing of the data packet using the source port logical information assigned to the data packet; and
determining, by the network device, at least one of (i) one or more egress physical ports of the network device, or (ii) one or more egress logical ports, for forwarding the data packet.

22. The method of claim 21, wherein the method includes:
determining, by the network device, the one or more egress logical ports;
mapping, by the network device, the one or more egress logical ports to the one or more egress physical ports of the network device; and
forwarding the data packet to the one or more egress physical ports based on the mapping.

23. The method of claim 22, wherein the method further comprises mapping at least one of the one or more egress logical ports to a tunnel interface to be applied to the data packet.

* * * * *